(12) United States Patent
Miyasaka

(10) Patent No.: US 7,293,883 B2
(45) Date of Patent: Nov. 13, 2007

(54) PROJECTOR AND PATTERN IMAGE DISPLAY METHOD

(75) Inventor: Noriaki Miyasaka, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 179 days.

(21) Appl. No.: 11/082,059

(22) Filed: Mar. 17, 2005

(65) Prior Publication Data

US 2005/0207027 A1    Sep. 22, 2005

(30) Foreign Application Priority Data

Mar. 19, 2004    (JP)    ............................. 2004-080445

(51) Int. Cl.
G03B 21/14    (2006.01)
(52) U.S. Cl. .................... 353/122; 353/69; 382/162
(58) Field of Classification Search ................ 353/122, 353/30, 31, 69, 101; 382/162, 274; 345/617
See application file for complete search history.

(56) References Cited

U.S. PATENT DOCUMENTS

2003/0223049 A1*    12/2003    Ohara ....................... 353/101

2004/0061838 A1*    4/2004    Mochizuki et al. ........... 353/69
2004/0145708 A1*    7/2004    Tanner et al. .................. 353/94

FOREIGN PATENT DOCUMENTS

JP    A 2000-241874    9/2000
JP    2003-348498    12/2003

* cited by examiner

*Primary Examiner*—William C. Dowling
(74) *Attorney, Agent, or Firm*—Oliff & Berridge, PLC

(57) ABSTRACT

A CPU 120 acquires a zoom volume Z conveyed by a zoom lens position detector 122, and calculates a light valve white area Sq according to that zoom volume Z. The CPU 120 revises the adjustment pattern image based on the calculated light valve white area Sq, rewrites the contents of the pattern image memory 107, and gives instructions to project the image to an image processing unit 108, and a liquid crystal light valve drive unit 110, etc. On the liquid crystal light valve 114 is formed a pattern image for which the white part area is revised to Sq, and that revised pattern image is enlarged and projected for display on the screen. The CPU 120 gives instruction for sense to the imaging control unit 105.

By doing this, even when the zoom position of the zoom lens changes, it is possible to have the average value of the gradation value of the white part for the sensed image approximately maintain the desired gradation value.

13 Claims, 8 Drawing Sheets

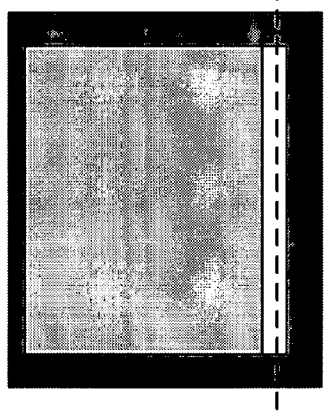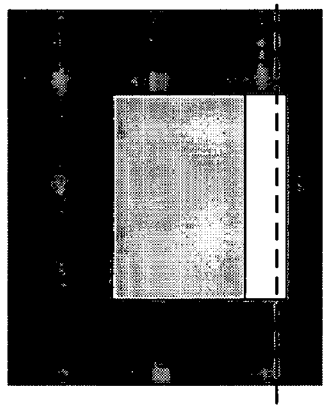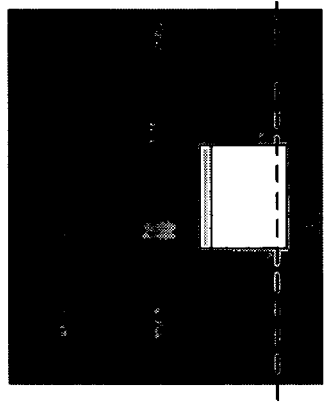

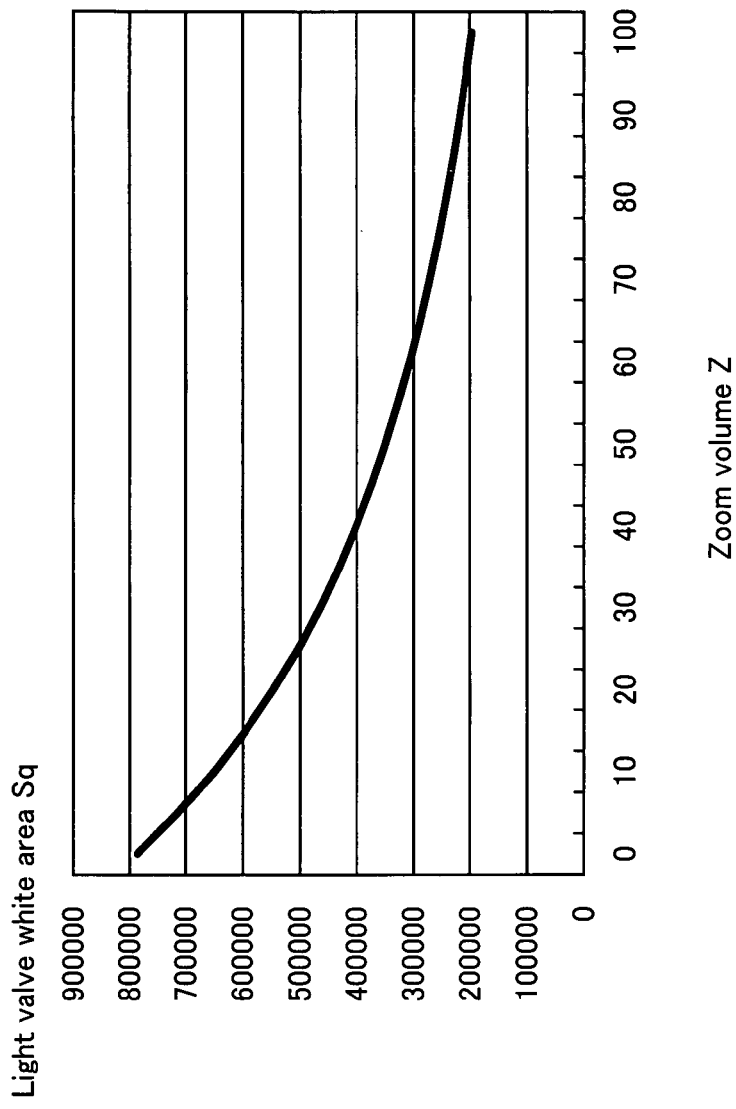

Fig.8(A) Fig.8(B)
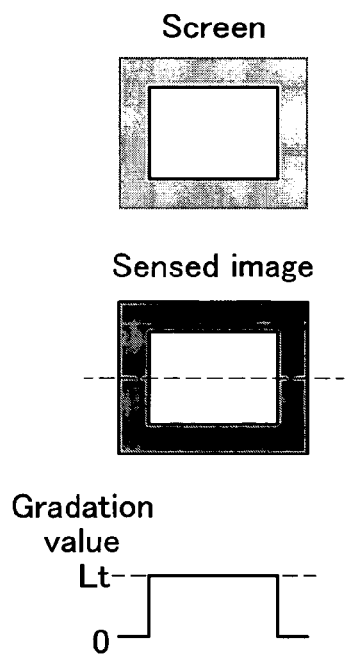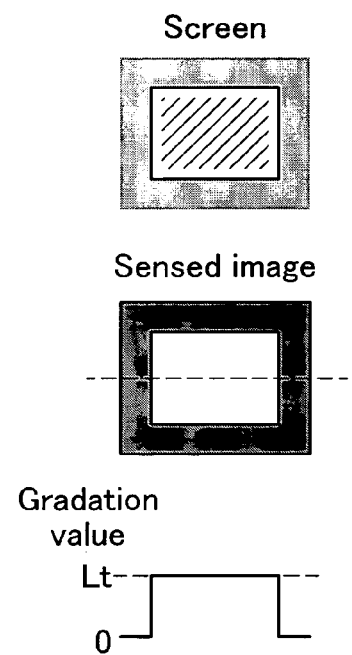
Fig.9(A) Fig.9(B) Fig.9(C)
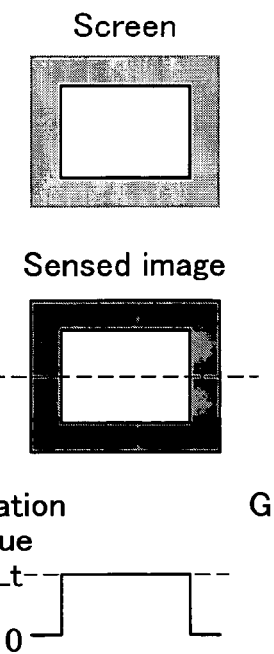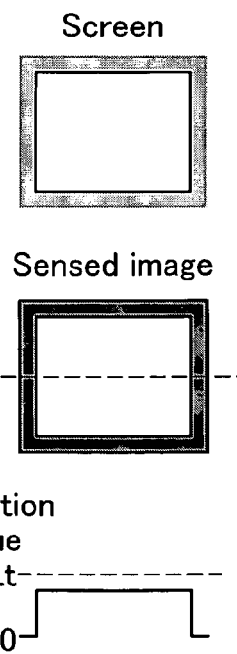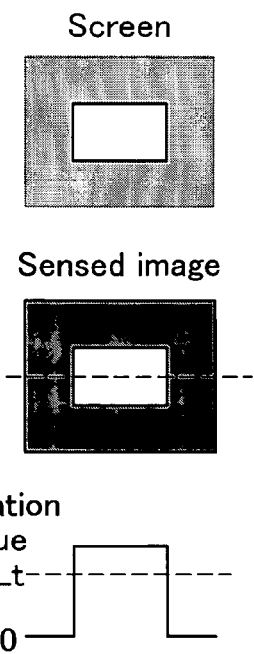

PROJECTOR AND PATTERN IMAGE DISPLAY METHOD

BACKGROUND OF THE INVENTION

1. Field of the Invention

The present invention relates to a projector that projects projected light onto a projection object such as a screen, and displays an image, and specifically relates to a projector which is equipped with a zoom lens which is able to change the size of the projected light range for which projected light is projected and with an imaging unit that senses an image of the projection object.

2. Description of the Related Art

In recent years, known projectors include those for which a zoom lens is equipped as the projection lens, and by driving that zoom lens and changing the zoom position of that zoom lens, the size of the projected light range formed on the screen can be varied freely.

Also, when installing this kind of projector in front of the screen, so that a suitable image will be displayed on the screen by the projected light that is projected from the projector onto the screen, it is necessary to make various adjustments such as zoom adjustment, keystone correction, and focus adjustment, etc. for the projector.

However, in the case of portable projectors, because there is a possibility of the relative position to the screen changing when the projector is installed, the user had to make the various adjustment noted above each time, which was very troublesome.

In light of this, in the past, for example as noted in Japanese Patent Laid-Open Gazettes No. 2000-241874, in addition to providing a monitor camera on the projector, when the projector is placed in front of a screen, first, at the projector, an adjustment pattern image formed on the liquid crystal light valve is enlarged and projected for display on the screen, the screen that displays this pattern image is sensed by the monitor camera, the sensed image is analyzed, and the various adjustments noted above were made to be automatically performed based on the analysis results.

Generally, with the monitor camera, there is provided a CCD (Charge Coupled Device) etc. that converts the incident light into electrical signals, and to set the overall brightness of the sensed image to a preset value (exposure target value), there is a function (auto exposure) for varying things such as shutter speed, gain (sensitivity) and aperture.

FIGS. 8(A) and (B) are explanatory diagrams for explaining the effect of auto exposure of the monitor camera for the prior art. In FIG. 8, the upper level shows a screen on which is displayed the adjustment pattern image, the middle level shows the sensed image that was obtained by sensing the screen using the monitor camera, and the lower level shows the value that shows the brightness of each pixel aligned along the center horizontal line (dotted line). Also, (A) shows the normal state of the projector, and (B) shows the state of the projector when set to low luminance.

Note that the value that shows the brightness of each pixel for the sensed image is called the gradation value hereafter. The concerned gradation value is a value that is obtained from image signals of the sensed image output from the monitor camera (CCD module).

In FIG. 8, the adjustment pattern image formed on the liquid crystal light valve is an all white image, and as shown in the upper level, in the screen, the range for which the pattern image is displayed, in other words, the white colored range, is the aforementioned projected light range.

Also, the sensed image obtained by sensing using the monitor camera is as shown in the middle level.

Also, in the lower level, the horizontal axis corresponds to the position of each pixel on the central horizontal line of the sensed image, and the vertical axis shows the gradation value of each pixel.

At the projector, when the light source lamp is set to low luminance, compared to during normal times, the luminance of the projected light projected from the projector is lower. Because of this, as shown in FIG. 8(B), the brightness of the pattern image displayed on the screen is darker than that during normal times shown in (A). However, when that pattern image is sensed with auto exposure by a monitor camera, even if the subject is dark, shutter speed, gain, or aperture, etc. are adjusted so as to correct the overall brightness of the sensed image, so as shown in FIG. 8 (B), the brightness of the pattern image is not different from the normal times shown in (A). Therefore, for the sensed image, the dark part (in other words, the part outside the projected light range) is dark to a negligible degree, so in comparison to the gradation value of each pixel for the black part being regarded as 0, the gradation value of each pixel for the white part (in other words, the pattern image part) almost doesn't change at all, and is left at the desired gradation value Lt.

In this way, by working the auto exposure function at the monitor camera, at the projector, the light source lamp is set to low luminance, and even if the brightness of the pattern image displayed on the screen becomes dark, for the sensed image, it is possible to maintain the gradation value of each pixel for the white part (in other words, the pattern image part) almost at the desired gradation value Lt the same as during normal times. This is not limited to times when set to low luminance, but is also the same in cases when there is a degradation over time of the light source lamp, so that the luminance decreases.

However, for a projector equipped with this kind of zoom lens and monitor camera, when the zoom position of the zoom lens was changed and the size of the projected light range on the screen was changed, there were the following kinds of problems due to the monitor camera auto exposure.

FIGS. 9(A) to (C) are explanatory diagrams that explain problems due to the monitor camera auto exposure when the zoom position is changed with the prior art. In FIG. 9, as with FIG. 8, the upper level shows the screen on which the adjustment pattern image is displayed, the middle level shows the sensed image of that screen, and the lower level shows the gradation value of the pixels for that sensed image. Also, (A) shows the state when the zoom lens zoom position is in the middle position, (B) shows the state when that zoom position is set to the wide angle side, and (C) shows a state when that zoom position is set to the telephoto side.

For the projector, when the zoom lens zoom position is set to the wide angle side, as shown in the upper level of FIG. 9(B), the area of the projected light range on the screen is wider than in the middle position of (A). Here, since the adjustment pattern image formed on the liquid crystal light valve is constant, when the area of the projected light range on the screen becomes wider, in accordance with this, the pattern image displayed on the screen also is enlarged. Therefore, when that pattern image is sensed by the monitor camera, for that sensed image, as shown in the middle level of FIG. 9(B), the area of the white part (in other words, the pattern image part) becomes wider than the middle position of (A), and the area of the black part (in other words, the part outside the projected light range) becomes narrower.

At this time, when that sensing is performed using auto exposure, the overall brightness of the sensed image is calculated as the exposure calculation value, and to make that exposure calculation value equivalent to a preset exposure target value, the shutter speed, gain, or aperture, etc. are controlled. Here, the overall brightness of the sensed image is a sum total of volume of the light detected with each pixel for the CCD converted to electrical signals and amplified, and that value is proportional to the average value of the gradation value of each pixel for that sensed image. Thus, normally, the exposure calculated value uses the average value of the gradation value of all pixels for the sensed image.

Meanwhile, since the exposure target value is a preset fixed value, as shown in FIG. 9(A), when the zoom position is the middle position, if we assume that the exposure calculation value matches the exposure target value, as described above, when the zoom position is put to the wide angle side and the area of the white part for the sensed image becomes wider, the average value of the gradation value of all pixels, in other words, the exposure calculated value, also rises above the exposure target value by the amount that the area became wider. As a result, when the auto exposure is operated, when the shutter speed, gain, or aperture, etc. are changed so that the exposure calculated value is equivalent to the exposure target value, the average value of the gradation value for all pixels for the sensed image decreases. As described above, for the sensed image, the black part is dark at a negligible level, and the gradation value of each pixel for the black part is regarded as 0, so as shown by the lower level in FIG. 9(B), the fact that the average value of the gradation value of all pixels decreases can be nothing other than the gradation value of each pixel for the white part decreasing to be lower than the desired gradation level Lt.

Conversely, when the zoom lens zoom position is on the telephoto side, as shown in the top level of FIG. 9(C), the area of the projected light range on the screen becomes narrow compared to the middle position of (A). Here, as described above, since the pattern image formed on the liquid crystal light valve is constant, when the area of the projected light range on the screen becomes narrow, along with this, the pattern image displayed on the screen is reduced. Therefore, when that pattern image is sensed by a monitor camera, for that sensed image, as shown by the middle level of FIG. 9(C), the area of the white part (in other words, the pattern image part) becomes narrower than the middle position of (A), and the area of the black part (in other words, the part outside the projected light range) becomes wider.

In this way, when the area of the white part for the sensed image becomes narrow, the average value of the gradation values of all the pixels, in other words, the exposure calculation value, decreases to lower than the exposure target value by the amount that the area became narrower. As a result, when the auto exposure is operated so as to change the shutter speed, gain, or aperture, etc. so that the exposure calculation value is equivalent to the exposure target value, the average value of the gradation values of all the pixels for the sensed image increases, and as a result, as shown by the lower level in FIG. 9(C), the gradation value of each pixel for the white part rises to higher than the desired gradation value Lt.

As explained above, with the prior art, when the zoom lens zoom position is set to the wide angle side and the area of the projected light range on the screen becomes wider, due to the monitor camera auto exposure, the gradation value of each pixel of the white part for the sensed image drops to lower than the desired gradation value Lt, and conversely, when set to the telephoto side and the area of the projected light range becomes narrower, the gradation value of each pixel of the white part rises to greater than the desired gradation value Lt, and in either case, it was not possible to maintain the average value of the gradation values of the white part at the desired gradation value Lt.

Therefore, in this way, when the average value of the gradation values of the white part for the sensed image departs from the desired gradation value Lt due to changes in the zoom lens zoom position, after that, as described above, that sensed image is analyzed, and based on the results of that analysis, when an attempt is made to perform various adjustments automatically, depending on the adjustment contents, there was the problem of not being able to perform suitable adjustments.

Note that this kind of problem can also occur in cases when the adjustment pattern image, not just when the whole surface is white, but is another specific color (e.g. green, etc.) other than white, or in cases when it is not the whole surface but rather part.

SUMMARY OF THE INVENTION

Therefore, the purpose of the present invention is to provide technology that solves the problems of the prior art noted above, and that is able to approximately maintain the average value of the gradation values of the specific color part shown with a specific color for the sensed image even when the zoom lens zoom position changes.

In order to attain at least part of the above and the other related objects, the present invention is directed to a first projector that projects projected light on a projection object to display an image. The first projector comprises:

an image forming unit that is able to form a specified pattern image to display on the projection object;

a zoom lens for which it is possible to change the size of the projected light range with which the projected light is projected;

a zoom lens position detector that detects the zoom position of the zoom lens;

a control unit;

a sensing unit that senses an image of the projection object; and an imaging control unit that calculates the exposure calculation value from the sensed image sensed by the sensing unit and performs exposure adjustments on the imaging unit so that the calculated exposure calculation value is approximately equivalent to the exposure target value set by the control unit, and wherein the control unit acquires the zoom position detected by the zoom lens position detector, and according to the acquired zoom position, changes the area of the specific color part shown by a specific color for the pattern image formed on the image forming unit.

In this way, with the first projector of the present invention, the area of the special color part for the pattern image formed on the image forming unit is changed according to the zoom lens zoom position. Therefore, for example, when attempting to make the projected light range on the projection object narrower, when the zoom position is set to the telephoto side, according to this, the area of the projected light range for the sensed image also becomes narrow, but as the zoom position goes to the telephoto side, if the area of the specific color part for the pattern image formed on the image forming unit is conversely changed to become wider, it is possible to keep the area of the specific color part for the sensed image approximately constant, so the average value of the gradation values of all pixels for the sensed image almost doesn't change at all. Specifically, for automatic exposure, rather than changing the exposure calculation value, since this stays equivalent to the exposure target value, it is possible to approximately maintain the average value of the gradation values of the specific color part for the sensed image at the desired gradation value.

In accordance with one preferable application of the first projector, the control unit calculates parameters relating to the area of the specific color part of the pattern image based on the acquired zoom position such that the average value of the gradation values of the specific color part for the sensed image sensed by the sensing unit is approximately equivalent to the desired gradation value regardless of changes to the zoom position, so that the pattern image with the area of the specific color part according to the calculated parameters is formed on the image forming unit.

Also, In accordance with another preferable application of the first projector, a specific color area table is prepared in advance, the specific color area table has parameters relating to an area of the specific color part for the pattern image respectively set so that the average value of the gradation values of the specific color part for the sensed image sensed by the sensing unit is approximately equivalent to the desired gradation value regardless of changes to the zoom position according to each zoom position of the zoom lens, and based on the acquired zoom position, the control unit references the specific color area table and derives the parameters corresponding to the zoom position, so that the pattern image with the area of the specific color part according to the derived parameters is formed on the image forming unit.

In this way, based on the acquired zoom position, by calculating parameters relating to the area of the specific color part for a pattern image or deriving them from an exposure target value table, and based on the obtained parameters, by having the image forming unit form a pattern image that has the specific color part area according to the parameters, it is possible to change the area of the specific color part for the pattern image according to the acquired zoom position, and even if the zoom position changes, it is possible to approximately maintain the average value of the gradation values of the specific color part for the sensed image at the desired gradation value.

The present invention is directed to a second projector that projects projected light onto a projection object to display an image. The second projector comprises:

an image forming unit that is able to form a specified pattern image for displaying on the projection object;

a zoom lens for which it is possible to change the size of the projected light range at which the projected light is projected;

a control unit;

a sensing unit that senses an image of the projection object; and an imaging control unit that calculates the exposure calculation value from the sensed image sensed by the sensing unit, and that performs exposure adjustments for the imaging unit so that the calculated exposure calculation value is approximately equivalent to the exposure target value set by the control unit, and wherein the control unit acquires a sensed image sensed by the sensing unit, derives parameters relating to the area of the specific color part shown by the specific color for the acquired sensed image, based on the derived parameters, changes the area of the specific color part for the pattern image formed on the image forming unit.

In this way, with the second projector of the present invention, parameters relating to the area of the specific color part for the sensed image are derived, and based on the derived parameters, the area of the specific color part for the pattern image formed on the image forming part is changed. The area of the specific color part for the sensed image correlates to the zoom lens zoom position, so instead of the zoom position, even if the area of the specific color part for the pattern image formed on the image forming unit is changed using the area of the specific color part for the sensed image, it is possible to have the same effect as the first projector noted above.

Also, for the projector of the present invention, it is also possible for the specific color to be white. It is also possible for the specific color to be another color other than white, such as green or gray, etc.

Moreover, the present invention is not limited to a device patent embodiment such as the projector noted above, but can also be realized as a method invention embodiment such as a method of displaying a specified pattern image on a projection object.

BRIEF DESCRIPTION OF THE DRAWINGS

FIGS. 5(A) through (C) are explanatory diagrams that show the sensed image and the gradation values of each pixel of the sensed image of each zoom position.

FIGS. 6(A) and (B) are explanatory diagrams that show an example of a white area table.

FIGS. 8(A) and (B) are explanatory diagrams that explain the effect of auto exposure of the monitor camera with the prior art.

FIGS. 9(A) through (C) are explanatory diagrams for explaining the problems due to auto exposure of the monitor camera when the zoom position is changed with the prior art.

DESCRIPTION OF THE PREFERRED EMBODIMENTS

Figure 1:
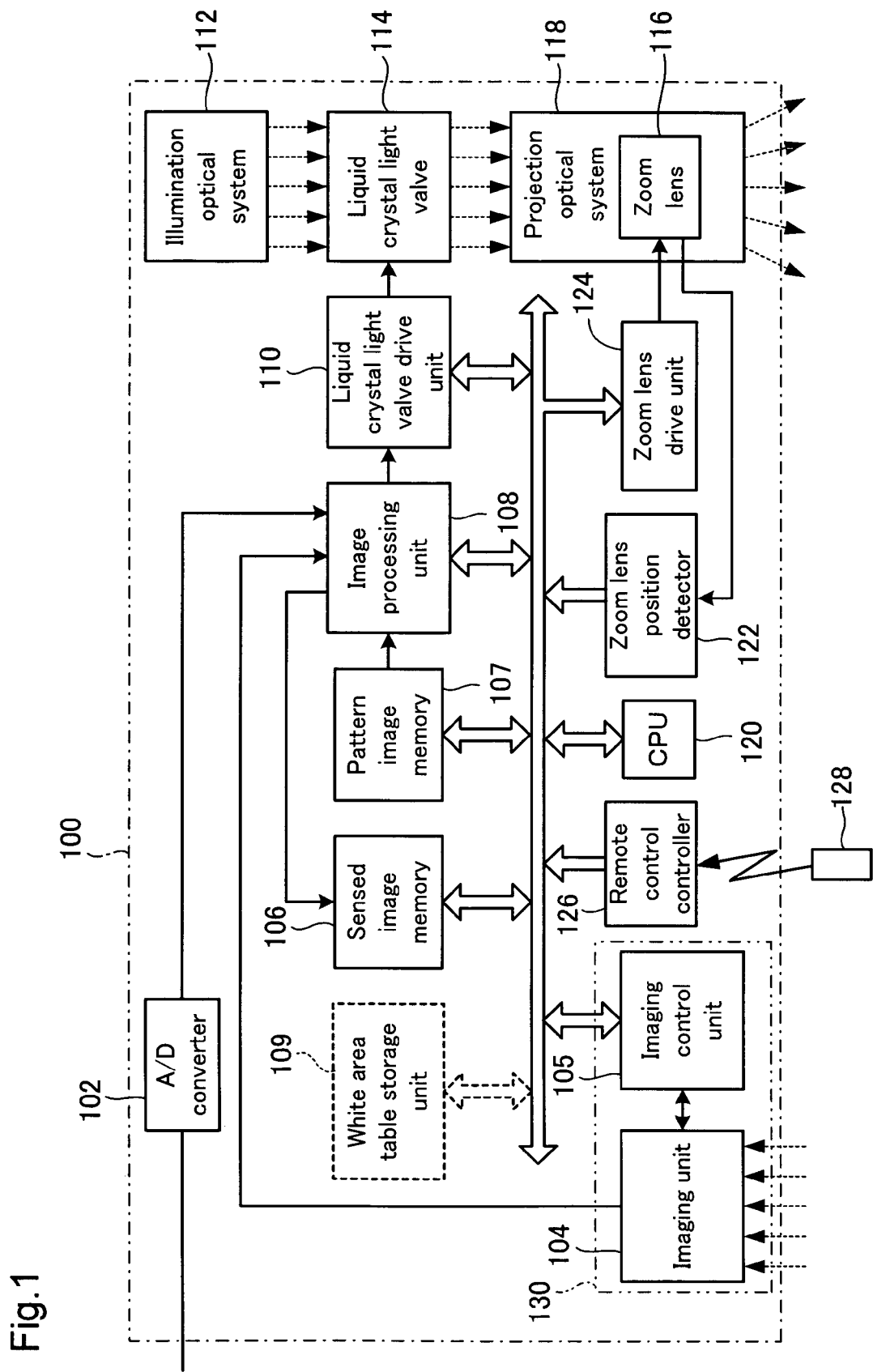
FIG. 1 is a block diagram that shows the structure of a projector as one embodiment of the present invention.

Following, we will explain preferred embodiments of the present invention based on embodiments in the following order.
1. Projector Structure:
2. Image Projection Operation:
3. Exposure Target Value Setting Operation:
4. Effect of the Embodiment:
5. Variation Examples:
　5-1. Variation Example 1:
　5-2. Variation Example 2:
　5-3. Variation Example 3:
　5-4. Variation Example 4:

5-5. Variation Example 5:
5-6. Variation Example 6:
5-7. Variation Example 7:
5-8. Variation Example 8:

1. Projector Structure:

FIG. 1 is a block diagram that shows the structure of a projector as an embodiment of the present invention. This projector 100 is a projector that is portable, and as shown in FIG. 1, comprises an A/D converter 102, an imaging unit 104, an imaging control unit 105, a sensed image memory 106, a pattern image memory 107, an image processing unit 108, a liquid crystal light valve drive unit 110, an illumination optical system 112, a liquid crystal light valve 114, a projection optical system 118 that includes a zoom lens 116, a CPU 120, a zoom lens position detector 122, a zoom lens drive unit 124, a remote control controller 126, and a remote control 128. Of these, the CPU 120 correlates to the controller in the claims, and the liquid crystal light valve 114 which is an optical electronic device correlates to the image forming unit in the claims.

Note that in FIG. 1, the CPU 120 is illustrated as being connected only to the imaging controller 105, the sensed image memory 106, the pattern image memory 107, the image processing unit 108, the liquid crystal light valve drive unit 110, the zoom lens position detector 122, the zoom lens drive unit 124, and the remote control controller 126 via a bus, but in fact, it is also connected to other structural units. Also, the imaging unit 104 includes a CCD, and the imaging unit 104 and the imaging control unit 105 form a CCD module 130 as a monitor camera. The zoom lens position detector 122 may be formed by a zoom encoder, etc., for example. Also, we will describe later the white area table storage unit 109 in FIG. 1.

Also, with this embodiment, the imaging unit 104 shown in FIG. 1 correlates to the imaging unit noted in the claims, the imaging controller 105 correlates to the imaging controller noted in the claims, the liquid crystal light valve 114 correlates to the image forming unit noted in the claims, the zoom lens 116 correlates to the zoom lens noted in the claims, the zoom lens position detector 122 correlates to the zoom lens position detector noted in the claims, and the CPU 120 correlates to the control unit noted in the claims.

2. Image Projection Operation:

First, we will give a brief explanation of the image projection operation which is the normal operation for the projector 100.

In FIG. 1, when the user uses the remote control 128 to start image projection, the remote control 128 conveys those input instructions to the remote controller 126 by wireless communication. The remote controller 126 conveys the instructions from the remote control 128 via a bus to the CPU 120. Based on these instructions, the CPU 120 controls each structural unit including the image processing unit 108, and performs the image projection operation.

First, the A/D converter 102 inputs the image signals output from a video player, television, or DVD player, etc., or image signals output from a personal computer, etc., converts these analog image signals to digital image signals, and outputs these to the image processing unit 108. The image processing unit 108 adjusts the input digital image signals so that the image display status (e.g. brightness, contrast, synchronization, tracking, color density, color tone, etc.) are in the desired state, and outputs these to the liquid crystal light valve drive unit 110.

The liquid crystal light valve drive unit 110 drives the liquid crystal light valve 114 based on the input digital image signal and forms an image on the liquid crystal light valve 114. By doing this, at the liquid crystal panel 114, the illumination light projected from the illumination optical system 112 is modulated according to that formed image. The projection optical system 118 is attached to the front of the case of the projector 100, and the projection light that is modulated by the liquid crystal light valve 114 is projected onto the screen (not illustrated). By doing this, the image is projected and displayed on the screen.

3. Pattern Image Varying Operation:

Now we will give a detailed explanation regarding the pattern image varying operation which is a characteristic part of the present invention for the projector 100.

With the prior art, as described above, the adjustment pattern image formed on the liquid crystal light valve was fixed, but with this embodiment, even when the zoom position of the zoom lens 116 is changed, so that the average value of the gradation values of the white part for the sensed images is approximately maintained, the area of the white part for the adjustment pattern image formed on the liquid crystal light valve is changed according to the zoom position.

In light of this, after the user installs the projector 100 at a desired position in front of the screen, when the power of the projector 100 is turned on, the projector 100 projects and displays the adjustment pattern image on the screen to perform various adjustments.

In specific terms, the CPU 120 generates an adjustment pattern image, writes this as digital image signals to the pattern image memory 107, and when instructions are given to do image projection to the image processing unit 108, or the liquid crystal light valve drive unit 110, etc., the image processing unit 108 reads the written digital image signal and outputs this to the liquid crystal light valve drive unit 110. The liquid crystal light valve drive unit 110 drives the liquid crystal light valve 114 based on the input digital image signals, and forms an adjustment pattern image like one that will be described later on the liquid crystal light valve 114. The liquid crystal light valve 114 modulates the illumination light projected from the illumination optical system 112 according to the formed pattern image. The projection optical system 118 projects the projection light modulated by the liquid crystal light valve 114 via a zoom lens 116, etc. onto the screen. By doing this, an adjustment pattern image is displayed on the screen. On the screen, the range for which this adjustment pattern image is displayed becomes the projected light range.

With this embodiment, as an adjustment pattern image, for example, an image that is divided top and bottom into two colors with the top part being black and the bottom part being white is used. Therefore, on the screen, the projected light range also will be divided top and bottom into two colors with the top part being black and the bottom part being white.

In this way, after displaying a pattern image on the screen, next, the user operates a zoom button (not illustrated) on the remote control 128 to adjust the size of the projected light range on the screen, and when instructions are given to move the zoom position, the remote control 128 conveys the input instructions using wireless communication to the remote control controller 126. The remote control controller 126 conveys the instructions from the remote control 128 to the CPU 120 via a bus. The CPU 120 controls the zoom lens drive unit 124 based on those instructions, drives the zoom lens 116 which the projection optical system 118 is equipped with, and moves the zoom position of the zoom lens 116.

After that, when the projected light range on the screen becomes the desired size, the user operates the zoom button on the remote control 128, and when instructions are given to stop moving the zoom position, the CPU 120 controls the zoom lens drive unit 124 based on those instructions and stops the movement of the zoom position of the zoom lens 116. During this time, the zoom lens position detector 122 detects the zoom position of the zoom lens 116, and conveys those detection results as zoom volume to the CPU 120. With this embodiment, the zoom volume is "0" when the zoom position is in the farthest edge of the telephoto side, and is "100" when in the farthest edge of the wide angle side.

Also, the CPU 120 reads from memory (not illustrated) a pattern image varying processing program and executes it. In specific terms, according to the processing procedure shown in FIG. 2, the CPU 120 controls each structural element including the pattern image memory 107, and performs the operation of varying the pattern image.

Figure 2:
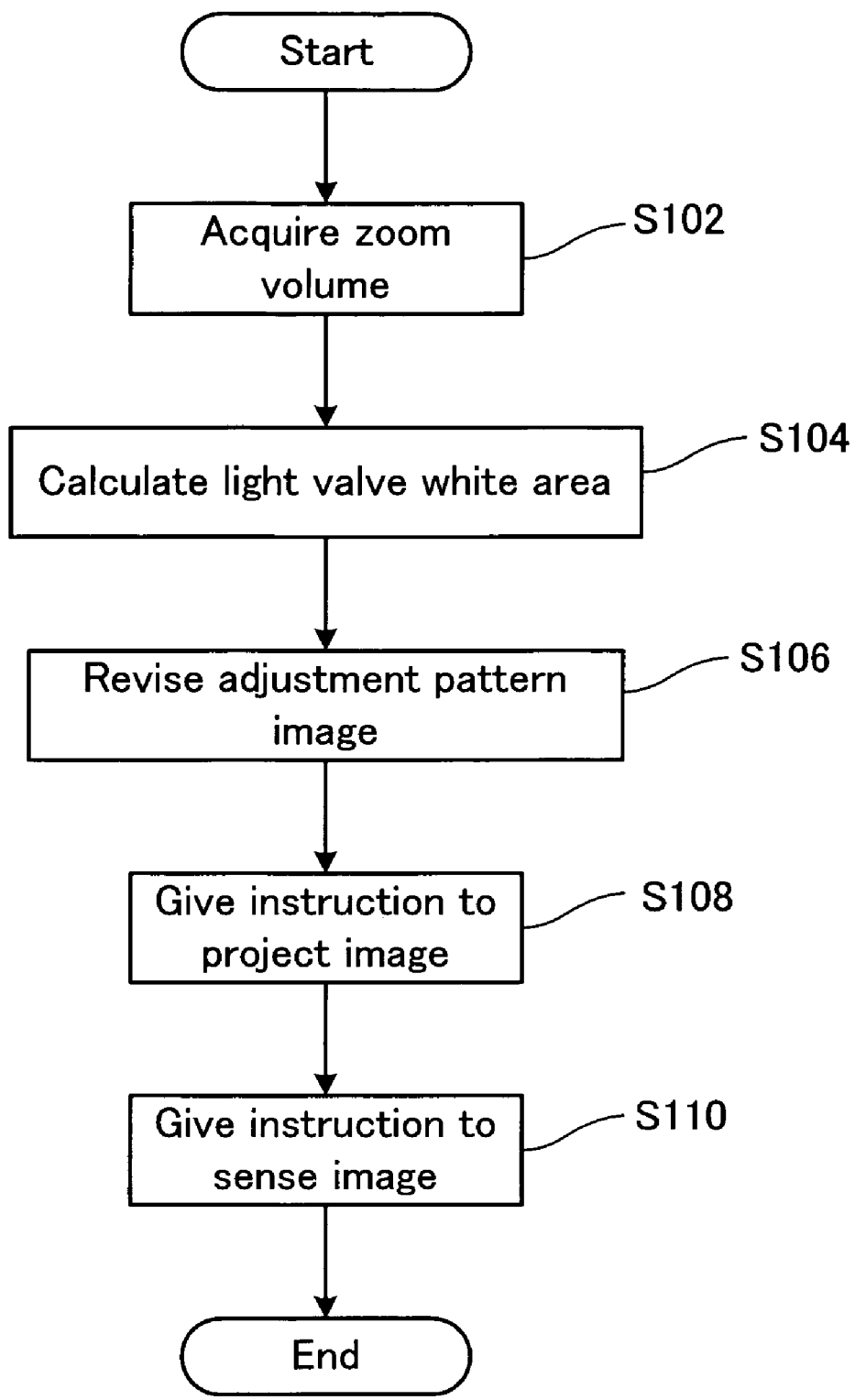
FIG. 2 is a flow chart that shows the processing procedure of the pattern image varying process for the projector of FIG. 1.

FIG. 2 is a flow chart that shows the processing procedure of the process of varying the pattern image for the projector of FIG. 1.

When the process shown in FIG. 2 is started, the CPU 120 acquires the zoom volume conveyed from the zoom lens position detector 122 (step S102), and based on the acquired zoom volume, the area of the white part for the pattern image to be formed on the liquid crystal light valve 114 (hereafter abbreviated as the light valve white area) is calculated (step S104). In specific terms, using the following technique, the light valve white area is calculated according to the zoom volume. Here, the acquired zoom volume is Z, and the light valve white area to be calculated is Sq.

Figure 3A:
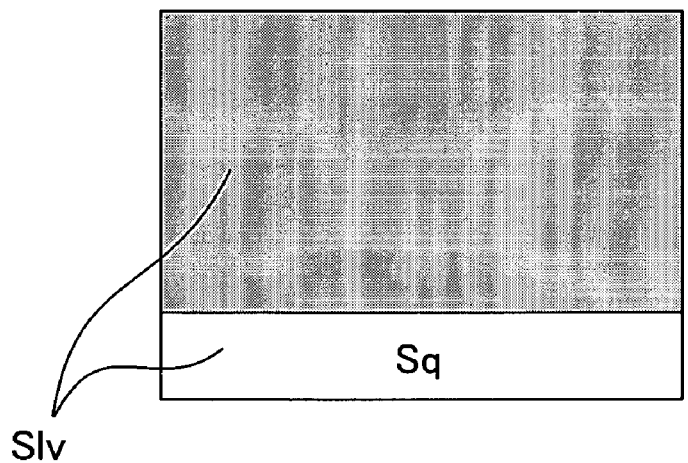
FIGS. 3(A) and (B) are explanatory diagrams that show the adjustment pattern image formed on liquid crystal light valve 114 and the sensed image sensed by the CCD module 130.

FIGS. 3(A) and (B) are explanatory diagrams that show the adjustment pattern image formed on the liquid crystal light valve 114 and the sensed image sensed by the CCD module 130. In FIG. 3, (A) is the adjustment pattern image formed on the liquid crystal light valve 114, and (B) is the sensed image for which the adjustment pattern image is enlarged and projected for display on the screen and that displayed screen is sensed by the CCD module 130. As described previously, the range for which this adjustment pattern image is displayed on the screen is the projected light range, so even for the sensed image, the projected light range part corresponds to the adjustment pattern image.

Figure 3B:
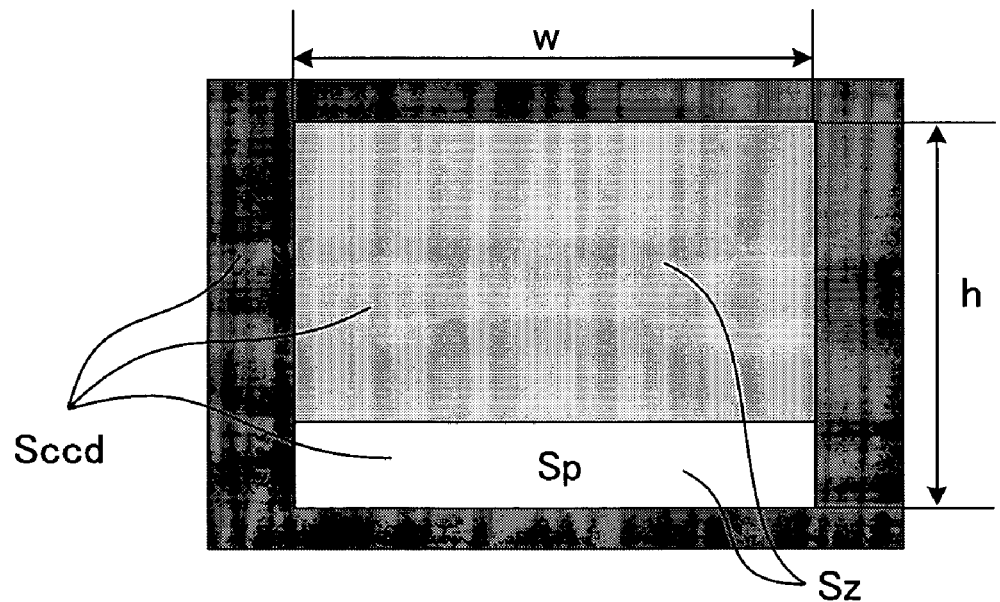

With this embodiment, as shown in FIG. 3(A), as the adjustment pattern image, used is an image which is divided top and bottom in two colors with the top part being black and the bottom part being white, so as shown in FIG. 3(B), in the sensed image, for the projected light range part, the upper part is the black part, and the bottom part is the white part. Also, the part outside the projected light range becomes a black part.

Now, for the sensed image, the length of the horizontal side of the projected light range is w, the length of the vertical side is h, and the area of the projected light range is Sz. The relationship between the size of the projected light range and the zoom volume Z is known to generally be with the length of the horizontal side of the projected light range being proportional to the zoom volume Z. Therefore, the length of the horizontal side of the projected light range w is shown by equation (1).

$$w = k \times Z + w0 \quad (1)$$

Note that k and w0 are each constants.

Thus, when the area Sz of the projected light range is shown by the zoom volume Z, from equation (1), the result is as shown in equation (2).

$$Sz = w \times h \quad (2)$$
$$= K \times w \times w$$
$$= Kx(k \times Z + w0)^2$$

Note that K is a coefficient according to the aspect ratio. For example, when the aspect ratio of the pattern image is 4:3, then K=¾.

Also, for the sensed image, when the area of the white part (in other words, the part under the projected light range) is Sp, the average value of the gradation values of the white part is L, the area of the overall sensed image is Sccd, and the average value of the gradation values of all the pixels of the sensed image is Lccd, then the relationship between the average value of the gradation values and the area becomes as shown in equation (3).

$$Lccd/L = Sp/Sccd \quad (3)$$

Therefore, the area of the white part Sp for the sensed image is shown by equation (4).

$$Sp = (Lccd \times Sccd)/L \quad (4)$$

For the sensed image, since the black part (in other words, the part outside the projected light range) is dark to a negligible degree, the gradation values of each pixel for the black part are regarded as 0.

Note that, for example, for the sensed image, though the gradation value of the pixel is not 0, for the parts for which it is a certain threshold value or less, this is judged as being outside the projected light range, and calculation can also be done by replacing the gradation values of the pixels for that part with 0.

However, with auto exposure, as described previously, as an exposure calculation value, the average value Lccd of the gradation values of all the pixels for the sensed image is used, and the shutter speed, gain, and aperture, etc. are controlled so that this exposure calculation value Lccd becomes equivalent to the exposure target value R. Therefore, in equation (4), by substituting R for Lccd, equation (4) becomes as shown in equation (5).

$$Sp = (R \times Sccd)/L \quad (5)$$

Here, the exposure target value R is a constant, and since the area of the overall sensed image Sccd is also a constant, regardless of changes in the zoom position of the zoom lens 116, specifically, in the zoom volume Z, to make it so that the average value L of the gradation values of the white part for the sensed image approximately maintains the desired gradation value Lt, at equation (5), Lt is substituted for L, and as is clear when equation (6) is derived, regardless of changes in the zoom position, it is acceptable to make it so that the area of the white part Sp of the sensed image is always constant.

$$Sp = (R \times Sccd)/Lt \quad (6)$$

Meanwhile, as described previously, for the sensed image, the projected light range part corresponds to the pattern image displayed on the screen, or said another way, the pattern image formed on the liquid crystal light valve 114. Therefore, with the area of the overall pattern image formed on the liquid crystal light valve 114 as Slv, for the sensed image, the ratio of the area of the white part Sp to the area of the projected light range Sz (area ratio) matches the ratio of the light valve white area Sq to the area of the overall pattern image Slv (area ratio) as shown with equation (7).

$$Sp/Sz=Sq/Slv \quad (7)$$

Therefore, the light valve white area Sq is shown by equation (8).

$$Sq=(Sp \times Slv)/Sz \quad (8)$$

In light of this, in equation (8), when Sz is substituted for the value of equation (2), the result is as shown in equation (9).

$$Sq=(Sp \times Slv)/\{K \times (k \times Z + w0^2)\} \quad (9)$$

Here, the area of the overall pattern image Slv is a constant, so as described previously, regardless of changes in the zoom position of the zoom lens 116, specifically, in the zoom volume Z, to make it so that the area of the white part Sp for the sensed image is always constant, in equation (9), regarding this white part area Sp as a constant, the light valve white area Sq can be calculated according to equation (9) based on the zoom volume Z. By working in this way, regardless of the zoom position, it is possible to calculate the light valve white area Sq and be able to maintain the average value of the gradation values of the white part for the sensed image at the desired gradation value. As is clear from equation (9), this kind of light valve white area Sq is inversely proportional to the square of the zoom volume Z.

Next, the CPU 120 corrects the adjusted pattern image based on the calculated light valve white area Sq, revises the contents of the pattern image memory 107 (step S106), and gives instructions to project the image to the image processing unit 108 or the liquid crystal light valve drive unit 110, etc. (step S108). By doing this, the pattern image for which the white part area is revised to Sq is formed on the liquid crystal light valve 114, and that revised pattern image is enlarged and projected for display on the screen.

Then, the CPU 120 gives instructions to sense to the imaging control unit 105 (step S110), and the pattern image varying process shown in FIG. 2 is ended.

By doing this, the imaging control unit 105 controls the imaging unit 104 and starts image sense. The imaging unit 104 senses the screen on which the pattern image is displayed. Also, at this time, the imaging control unit 105 calculates as an exposure calculation value the average value Lccd of the gradation values of all the pixels from the sensed image sensed by the imaging unit 104, and so that this exposure calculation value is equivalent to the preset exposure target value R, it controls the shutter speed, gain, or aperture, etc. for the imaging unit 104 and performs auto exposure.

In this way, when the imaging unit 104 senses the screen on which the pattern image is displayed, the sensed image is output to the image processing unit 108 as digital image signals. The image processing unit 108 performs the desired processing on the input digital image signals, after which it writes to the sensed image memory 106 and updates the contents.

After that, the CPU 120 reads the digital image signals from the sensed image memory 106, takes the sensed image, and analyzes that sensed image. Then, based on those analysis results, it executes various adjustments.

Figure 4C:
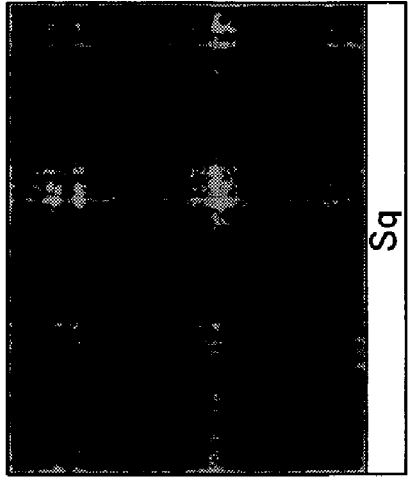
FIGS. 4(A) through (C) are explanatory diagrams that show the pattern image formed on the liquid crystal light valve 114 of each of the zoom positions.
Figure 4B:
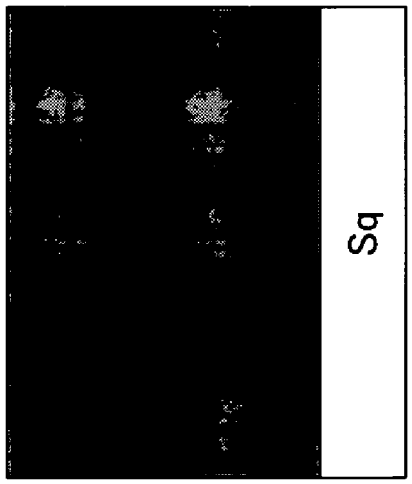
Figure 4A:
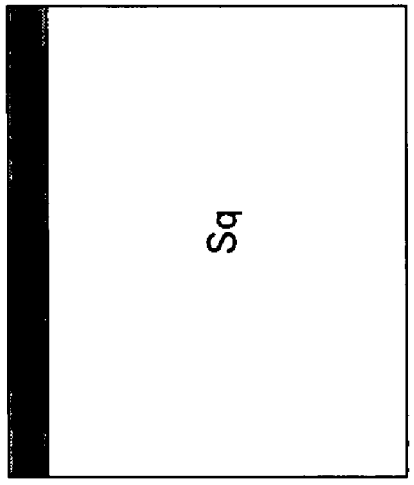

4. Effect of the Embodiment:

FIGS. 4(A) to (C) are explanatory diagrams that show a pattern image formed on the liquid crystal light valve 114 for each of the zoom positions. FIGS. 5(A) to (C) similarly are explanatory diagrams that show the sensed image and the gradation value of each pixel of the sensed image for each of the zoom positions, and in FIG. 5, the top level shows the sensed image sensed by the CCD module 130, and the bottom level shows the gradation value of each pixel aligned along a horizontal line shown by the dotted line for that sensed image. Also, in FIGS. 4 and 5, (A) shows the state when the zoom position of the zoom lens is on the telephoto side, (B) shows the state when the zoom position is in the middle position, and (C) shows the state when the zoom position is on the wide angle side. In specific terms, the middle position of (B) is a 2X zoom position to the wide angle side with the telephoto side position of (A) as a reference, and the side angle side position of (C) is a 3X zoom position to the wide angle side with the telephoto side position of (A) as a reference.

When the zoom position is the middle position, as shown in the bottom level of FIG. 5(B), the gradation value of each pixel of the white part for the sensed image matches the desired gradation value Lt. With this embodiment, the light valve white area Sq is changed according to equation (9) based on the zoom position of the zoom lens 116, specifically, the zoom volume Z. In specific terms, for the pattern image formed on the liquid crystal light valve 114, with the horizontal side length of the white part left as is, by changing the vertical side length, the light valve white area Sq is changed.

In light of this, when the user sets the zoom position to the telephoto side to try to narrow the projected light range on the screen (in other words, when the zoom volume Z is reduced), based on this, the projected light range area Sz for the sensed image also becomes narrower than the middle position of (B) as shown in the upper level of FIG. 5(A), but the light valve white area Sq conversely becomes wider according to equation (9) as shown in FIG. 4(A). Therefore, the white part for the sensed image (in other words, the part under the projected light range) has its shape change compared to the middle position of (B) as shown in the upper level of FIG. 5(A), but since its area Sp does not change, the average value of the gradation values of all the pixels for the sensed image does not change.

Meanwhile, when the user sets the zoom position to the wide angle side (in other words, when he increases the zoom volume Z) to widen the projected light range on the screen, based on this, the projected light range area Sz for the sensed image also becomes wider compared to the middle position (B) as shown in the upper level of FIG. 5(C), but the light valve white area Sq conversely becomes narrower according to equation (9) as shown in FIG. 4(C). Therefore, the white part for the sensed image (in other words, the part under the projected light range) has a shape that is changed compared to the middle position of (B) as shown in the top level of FIG. 5(C), but since the area Sp does not change, the average value of the gradation values of all the pixels for the sensed image does not change. Specifically, with auto exposure, the exposure calculation value does not change and is equivalent to the exposure target value, so with this embodiment, as shown in the lower level of FIG. 5(C), it is possible to approximately maintain the gradation values of each pixel for the white part at the desired gradation value Lt.

Incidentally, for the pattern image formed on the liquid crystal light valve 114 shown in FIG. 4, when the light valve white area Sq is shown as an area ratio in relation to the overall pattern image, it is 90% in the telephoto side position of (A), and in comparison to this, it is 22.5% ($=90/2^2$) at the middle position of (B), and is 10% ($=90/3^2$) at the wide angle side position of (C).

As explained above, with this embodiment, even if the zoom position of the zoom lens 116 is changed, it is possible to approximately maintain the average value of the gradation values of the white part for the sensed image at the desired gradation value Lt.

5. Variation Examples:

Note that the present invention is not limited to the embodiments and working examples noted above, and can be implemented in various formats without straying from the scope of the key points.

5-1. Variation Example 1:

With the embodiment noted above, the light valve white area Sq according to the zoom volume Z was derived by the CPU 120 calculating according to equation (9), but the present invention is not limited to this. For example, for each zoom volume, the light valve white area Sq is obtained in advance by calculation or actual measurement according to that zoom volume Z, and with those results as the white area table, this is stored in the white area table storage unit 109 shown by the dotted line in FIG. 1. Then, the CPU 120 reads and references that white area table from the white area table storage unit 109, and from the acquired zoom volume Z, can also derive the light valve white area Sq based on that zoom volume Z.

FIGS. 6(A) and (B) are explanatory diagrams that show an example of that kind of white area table. In FIG. 6, (A) shows the contents of the white area table, and (B) is a graph that shows the relationship between the zoom volume Z obtained from that white area table and the light valve white area Sq.

With this example, since the CCD that the imaging unit 104 has is 640×480 pixels, the sensed image overall area Sccd is 640×480. Also, as an adjustment pattern image, when using an image of aspect ratio 4:3, when the zoom position is in the far edge of the telephoto side, the area Sz of the projected light range for the sensed image is 300×225, while in contrast to this, when in the far edge of the wide angle side, it is 600×450. Note that the white part area Sp for the sensed image has an overall projected light range of 300×225 when the zoom position is in the far edge of the telephoto side. Furthermore, the desired gradation value Lt is 200, and the exposure target value R (=Sp×L/Sccd) is 43.95. Also, the area Slv of the overall pattern image formed on the liquid crystal light valve 114 is 1024×768.

As described previously, the light valve white area Sq is inversely proportional to the square of the zoom volume Z, so as shown in FIG. 6, the light valve white area Sq decreases as the zoom volume Z increases. In other words, as the light valve white area Sq, the further the zoom position of the zoom lens 116 is on the telephoto side, the larger the value is, and the further it is on the wide angle side, the smaller the value is.

Note that with the white area table shown in FIG. 6(A), the zoom volume Z is noted as a value in increments of "5," but actually, when that noted value is a, for example, in relation to a zoom volume Z of a range a−2.5<Z≦a+2.5, a light valve white area Sq that corresponds to value a is used.

5-2. Variation Example 2:

With the embodiment noted above, as an adjustment pattern image, an image is used divided into two colors top and bottom, for which in the perpendicular direction, the upper part is black, and the lower part is white, but the present invention is not limited to this. Therefore, as an adjustment pattern image, it is possible to use a suitable pattern image according to the contents of the adjustment that is performed later.

Also, for the adjustment pattern image formed on the liquid crystal light valve 114, we changed the light valve white area Sq by leaving the length of the horizontal side of the white part and changing the length of the vertical side, but the present invention is not limited to this, and any shape can be used for the white part shape as long as the light valve white area Sq is a value derived according to the zoom position.

Furthermore, for example as the adjustment pattern image, instead of the white color noted above, it is also possible to use a different specific color such as green or gray, for example.

5-3. Variation Example 3:

With the embodiment noted above, the imaging control unit 105 controlled the shutter speed, gain, or aperture, etc. of the imaging unit 104, but the present invention is not limited to this, and it is also possible to control any one of these shutter speed, gain, or aperture, or to perform auto exposure, or to combine two or more of these and control them to perform auto exposure.

5-4. Variation Example 4:

With the embodiment noted above, when the zoom position was in the far edge of the telephoto side, the zoom volume was "0," and when it was at the far edge of the wide angle side, the zoom volume was "100," but the present invention is not limited to this, and it is also possible to have the zoom volume be a value other than "100" when at the far edge of the wide angle side. Also, when the zoom position is at the far edge of the wide angle side, it is also possible to have the zoom volume be "0." It is also possible to give the zoom volume an offset value. Furthermore, as long as it is a value that corresponds to the zoom position of the zoom lens 116, it is possible to use a value other than the zoom volume.

Note that with this variation example, the equations (1), (2), and (9) themselves described previously must be revised according to that variation.

5-5. Variation Example 5:

In the embodiment noted above, the light valve white area Sq was directly derived based on the zoom position of the zoom lens 116, but the present invention is not limited to this, and it is also possible to, instead of the light valve white area Sq, derive an area ratio of the light valve white area Sq in relation to the area Slv of the overall pattern image to be formed on the liquid crystal light valve 114. Or it is also possible to derive the length of the white part horizontal side and/or the length of the vertical side, or the pixels that form the white part, in other words, the pixel count of the white pixels, for the pattern image to be formed on the liquid crystal light valve 114.

5-6. Variation Example 6:

In the embodiment noted above, the zoom position of the zoom lens 116, in other words, the zoom volume Z, was detected by the zoom lens position detector 122, and the light valve white area Sq was derived based on that detected zoom volume Z, but the present invention is not limited to this, and it is also possible to, instead of the zoom volume Z, use the area Sp of the white part (in other words, the part under the projected light range) or the sensed image.

As shown with the prior art, regardless of changes in the zoom position of the zoom lens 116, in other words, the zoom volume Z, when the light valve white area Sq is constant, the ratio (area ratio) of the light valve white area Sq in relation to the area Slv of the overall pattern image on the liquid crystal light valve 114 is also constant. Therefore, when the area ratio at this time is Tc, then the projected light range area Sz is expressed as shown in equation (10).

$$Sz = Tc \times Sp \quad (10)$$

Meanwhile, as described previously, the projected light range area Sz changes according to equation (2) when the zoom volume Z changes. Therefore, in equation (2), when the value in equation (1) is substituted for Sz, the result is as shown in equation (11).

$$Tc \times Sp = K \times (k \times Z + w0)^2 \quad (11)$$

Specifically, regardless of changes in the zoom volume Z, when the light valve white area Sq is constant, the white part area Sp for the sensed image changes according to equation (11) based on changes in the zoom volume Z.

Thus, regardless of changes in the zoom volume Z, when the light valve white area Sq is constant, it is also possible to use the white part area Sp for the sensed image instead of the zoom volume Z.

Incidentally, as described previously, regardless of changes in the zoom position of the zoom lens 116, in other words, the zoom volume Z, to have the average value L of the gradation values of the white part for the sensed image approximately maintain the desired gradation value Lt, in equation (5), it is also possible to substitute Lt for L and to derive the equation (6). However, in equation (6), the exposure target value R is a constant, the area Sccd of the overall sensed image is also a constant, and the desired gradation value Lt is also a constant, so the white part area Sp for the sensed image is a constant. Therefore, when the white part area in this case is Spc, the result of equation (6) is as shown in equation (6').

$$Spc = (R \times Sccd)/Lt \quad (6')$$

Meanwhile, as described previously, the light valve white area Sq is expressed by equation (9) when the zoom volume Z is used.

$$Sq = (Sp \times Slv)/\{K \times (k \times Z + w0)^2\} \quad (9)$$

Therefore, in equation (9), when Spc of equation (6') is substituted for Sp, and the value of equation (11) is substituted for $\{K \times (k \times Z + w0)^2\}$, the result is as shown in equation (12).

$$Sq = \{(R \times Sccd) \times Slv\} \times \{Lt \times (Tc \times Sp)\} \quad (12)$$

Thus, regardless of changes in the zoom position of the zoom lens 116, in other words, the zoom volume Z, to have the average value L of the gradation values of the white part for the sensed image approximately maintain the desired gradation value Lt, it is possible to derive the light valve white area Sq according to equation (12) based on the white part area Sp for the sensed image when the light valve white area Sq is constant. As is clear from equation (12), that kind of light valve white area Sq is inversely proportional to the white part area Sp for the sensed image.

The structure of the projector for this working example is about the same as the structure of projector 100 shown in FIG. 1. However, with this variation example, because there is no need to grasp the zoom position of the zoom lens 116, in other words, the zoom volume, there is no need for the zoom lens detector 122.

Figure 7:
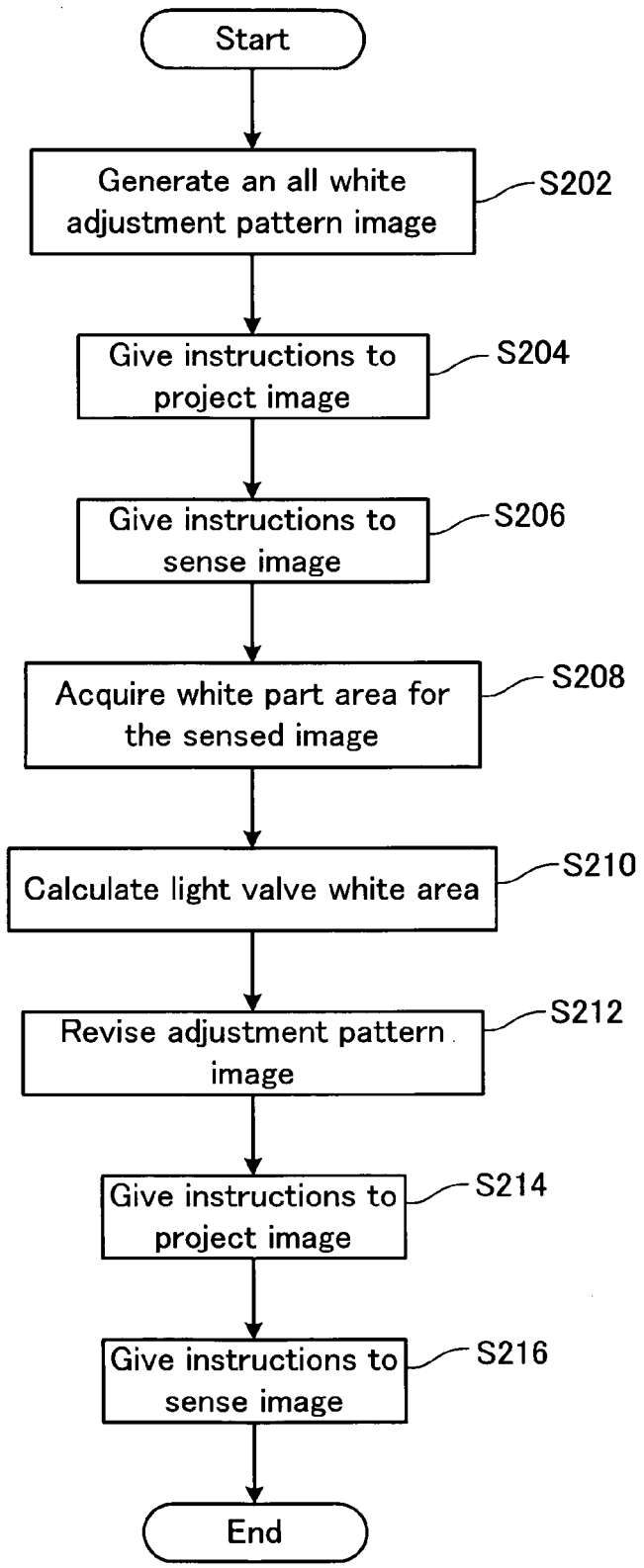
FIG. 7 is a flow chart that shows the processing procedure of the pattern image varying process for a variation example.

FIG. 7 is a flow chart that shows the processing procedure for the pattern image varying process of a variation example.

When the user moves the zoom position of the zoom lens 116 to a desired position by operating the zoom button on the remote control 128, when the process shown in FIG. 7 is started, the CPU 120 generates an all white image as the adjustment pattern image, and writes this as digital image signals to the pattern image memory 107 (step S202). Instruction are given to project the image to the image processing unit 108, and the liquid crystal light valve driver unit 110, etc. (step S204). By doing this, the all white pattern image is formed on the liquid crystal light valve 114, and that pattern image is enlarged and projected for display on a screen. On the screen, the range in which the pattern image is displayed is the projected light range, but in this case, the pattern image is an all white image, so the overall white part displayed as a pattern image on the screen is the projected light range.

Next, the CPU 120 gives instructions to sense an image to the imaging control unit 105 (step S206). By doing this, the imaging control unit 105 controls the imaging unit 104, image sensing starts, and the imaging unit 104 senses the screen on which the all white pattern image is displayed. The sensed image that is sensed by the imaging unit 104 is written as digital image signals via the image processing unit 108 to the sensed image memory 106.

Next, the CPU 120 reads the digital image signals from the sensed image memory 106, and by implementing binarization processing, it acquires a black and white binary sensed image, analyzes this acquired sensed image, and acquires the white part area Sp for the sensed image (step S208). At this time, an all white pattern image is formed on the liquid crystal light valve 114 as described above, and therefore, on the liquid crystal light valve 114, the light valve white area Sq is equivalent to the area Slv of the overall pattern image, and this is constant.

Note that for the sensed image, the area of the white part is proportional to the pixel count of the white pixels, so the CPU 120 counts the pixel count of the white pixels from the white and black binary sensed image, and by doing this, is able to derive the white part area Sp.

Next, the CPU 120 calculates the light valve white area Sq (step S210) according to the equation (12) as described previously based on the acquired white part area Sp.

Then, the CPU 120 revises the adjustment pattern image based on the calculated light valve white area Sq, rewrites the contents of the pattern image memory 107 (step S212), and gives instructions to project images to the image processing unit 108, or the liquid crystal light valve drive unit 110, etc. (step S214). By doing this, on the liquid crystal light valve 114, rather than an all white area, a pattern image for which the white part area is revised to Sq is formed, and that revised pattern image is enlarged and projected for display on the screen.

Then, the CPU 120 gives instructions to sense an image to the imaging control unit 105 (step S216), and ends the pattern image varying process shown in FIG. 7.

By doing this, the imaging control unit 105 controls the imaging unit 104 and starts image sense. The imaging unit 104 senses the screen on which the pattern image is displayed. Also, at this time, the imaging control unit 105 calculates as the exposure calculation value the average value Lccd of the gradation values of all the pixels from the sensed image sensed by the imaging unit 104, and so that that exposure calculation value is equivalent to the preset exposure target value R, the shutter speed, gain, and aperture, etc. for the imaging unit 104 are controlled and auto exposure is performed.

By operating as described above, even with this variation example, it is possible to have the average value of the gradation values of the white part for the sensed image approximately maintain the desired gradation value in relation to changes in the zoom position of the zoom lens 116.

5-7. Variation Example 7:

For the variation example 5 noted above, we derived the light valve white area Sq based on the white part area Sp for the sensed image, but it is also possible to, instead of the white part area Sp, derive the light valve white area Sq based on the length of the horizontal side of the white part or the length of the vertical side.

5-8. Variation Example 8:

As an optoelectronic device for the projector 100, we used a liquid crystal light valve 114, but the present invention is not limited to this, and it is also possible to use various devices that form images based on image signals, and that project light that has been modulated according to those formed images. For example, it is also possible to use a DMD (digital micro mirror device) (trademark of TI Corp.), or to use a CRT or plasma display panel, etc.

What is claimed is:

1. A projector that projects projected light on a projection object to display an image, comprising:
    an image forming unit that is able to form a specified pattern image to display on the projection object;
    a zoom lens for which it is possible to change size of a projected light range with which projected light is projected;
    a zoom lens position detector that detects zoom position of the zoom lens;
    a control unit;
    a sensing unit that senses an image of the projection object; and
    an imaging control unit that calculates an exposure calculation value from the sensed image sensed by the sensing unit and performs exposure adjustments on the sensing unit so that the calculated exposure calculation value is approximately equivalent to an exposure target value set by the control unit,
    and wherein the control unit acquires the zoom position detected by the zoom lens position detector, and according to the acquired zoom position, changes an area of a specific color part shown by a specific color for the pattern image formed on the image forming unit.

2. The projector according to claim 1, wherein
    the control unit calculates parameters relating to the area of the specific color part of the pattern image based on the acquired zoom position such that average value of gradation values of the specific color part for the sensed image sensed by the sensing unit is approximately equivalent to the desired gradation value regardless of changes to the zoom position, so that the pattern image with the area of the specific color part according to the calculated parameters is formed on the image forming unit.

3. The projector according to claim 1, wherein
    a specific color area table is prepared in advance, the specific color area table has parameters relating to an area of the specific color part for the pattern image respectively set so that average value of gradation values of the specific color part for the sensed image sensed by the sensing unit is approximately equivalent to the desired gradation value regardless of changes to the zoom position according to each zoom position of the zoom lens, and
    based on the acquired zoom position, the control unit references the specific color area table and derives parameters corresponding to the zoom position, so that the pattern image with the area of the specific color part according to the derived parameters is formed on the image forming unit.

4. A projector that projects projected light onto a projection object to display an image, comprising:
    an image forming unit that is able to form a specified pattern image for displaying on the projection object;
    a zoom lens for which it is possible to change size of a projected light range at which the projected light is projected;
    a control unit;
    a sensing unit that senses an image of the projection object; and an imaging control unit that calculates an exposure calculation value from the sensed image sensed by the sensing unit, and that performs exposure adjustments for the sensing unit so that the calculated exposure calculation value is approximately equivalent to exposure target value set by the control unit, and wherein the control unit acquires a sensed image sensed by the sensing unit, derives parameters relating to an area of a specific color part shown by a specific color for the acquired sensed image, based on the derived parameters, changes the area of the specific color part for the pattern image formed on the image forming unit.

5. A projector according to claim 1, wherein the specific color is white.

6. A projector according to claim 2, wherein the specific color is white.

7. A projector according to claim 3, wherein the specific color is white.

8. A projector according to claim 4, wherein the specific color is white.

9. A method of displaying a specified pattern image on a projection object, for a projector that projects projected light on the projection object to display an image while also comprising a zoom lens capable of a zoom lens capable of changing a size of a projected light range by which projected light is projected and a sensing unit that senses an image of the projection object, the pattern image display method comprising the steps of:
    (a) detecting a zoom position of the zoom lens;
    (b) deriving parameters relating to an area of a specific color part shown by specific color for the pattern image to be formed based on the detected zoom position;
    (c) forming the pattern image that has the area of the specific color part according to the derived parameters based on the parameters; and
    (d) displaying the formed pattern image on the projection object.

10. The pattern image display method according to claim 9, wherein
    at step (b), based on the zoom position, a value such that average value of gradation value of the specific color part for the sensed image sensed by the sensing unit is approximately equivalent to the desired gradation value regardless of changes in the zoom position is derived as the parameter.

11. The pattern image display method according to claim 9, wherein the specific color is white.

12. The pattern image display method according to claim 10, wherein the specific color is white.

13. The pattern image display method according to claim 9, wherein the specific color part includes a solid black space.

* * * * *